United States Patent
Ginter

(10) Patent No.: US 6,807,902 B1
(45) Date of Patent: Oct. 26, 2004

(54) ADJUSTABLE FOLDING TRAVEL TRAY

(76) Inventor: Robert G. Ginter, 5103 S. 38th St., Omaha, NE (US) 68107

( * ) Notice: Subject to any disclaimer, the term of this patent is extended or adjusted under 35 U.S.C. 154(b) by 8 days.

(21) Appl. No.: 10/236,825

(22) Filed: Sep. 6, 2002

(51) Int. Cl.[7] .............................................. A47B 23/00
(52) U.S. Cl. .......................................... 100/44; 108/42
(58) Field of Search ............................. 108/42, 44, 47, 108/48, 152, 115, 45, 46; 297/155, 162, 173

(56) References Cited

U.S. PATENT DOCUMENTS

| | | | | |
|---|---|---|---|---|
| 432,901 A | * | 7/1890 | Roos | 108/42 |
| 3,197,253 A | * | 7/1965 | Brown | 297/162 |
| 3,717,375 A | * | 2/1973 | Slobodan | 297/162 |
| 4,037,896 A | * | 7/1977 | Kennedy et al. | 108/47 |
| 5,588,697 A | * | 12/1996 | Yoshida et al. | 108/47 |
| 5,709,155 A | * | 1/1998 | Terracciano | 108/42 |
| 5,775,655 A | * | 7/1998 | Schmeets | 108/42 |

FOREIGN PATENT DOCUMENTS

JP          3-272708      * 12/1991

* cited by examiner

Primary Examiner—Jose V. Chen

(57) ABSTRACT

A fold-down travel tray includes a tray with a pivotal axis slidably journaled in a slot on a bracket on the upper end of a support post, to permit the tray to be moved between a horizontal working position and a vertical storage position. The pivot axis and associated slot are positioned such that the tray is released from the working position by sliding the pivot axis from one end of the slot to the other. The post is slidably journaled through a sleeve on a mounting plate, to permit vertical adjustment of the height of the tray.

4 Claims, 4 Drawing Sheets

ADJUSTABLE FOLDING TRAVEL TRAY

CROSS-REFERENCES TO RELATED APPLICATIONS (Not applicable)

STATEMENT AS TO RIGHTS TO INVENTIONS MADE UNDER FEDERALLY SPONSORED RESEARCH AND DEVELOPMENT (Not applicable)

BACKGROUND OF THE INVENTION (1) Field of the Invention

The present invention relates generally to travel trays for vehicles, and more particularly to an adjustable fold-down travel tray for the cab of a tractor-trailer truck.

(2) Background Information

One of the major inconveniences of driving a long-haul vehicle such as a conventional tractor-trailer truck is the little space available to support snacks and beverages and the like. In most cases, the driver must either insert a heavy and cumbersome console to rest between the seats in the cab, or the materials must be rested on the floor of the vehicle.

The hazards of placing such material on the floor are obvious. First, a beverage container will likely spill its contents on a rough road, or upon the occurrence of braking the vehicle. In the alternative, the driver may attempt to hold the beverage container in an upright position, while leaning down to the floor and simultaneously trying to maintain control of the vehicle. Neither situation is safe.

While a console provides a better support for such snacks, the console can be unwieldy to move in and out of the vehicle. In addition, a console that is not bolted down becomes a dangerous flying object within the cab in the event of a collision or other road emergency.

BRIEF SUMMARY OF THE INVENTION

It is therefore a general object of the present invention to provide an improved adjustable fold-down travel tray for a vehicle.

Another object of the present invention is to provide a travel tray that is fastened into position in a vehicle, yet is simple and convenient to set up and store.

Still another object is to provide a fold-down travel tray that may be setup and stored by the use of one hand.

Yet a further object is to provide a fold-down travel tray that is economical to manufacture and easy to use.

These and other objects will be apparent to those skilled in the art.

The fold-down travel tray of the present invention includes a tray with a pivotal axis slidably journaled in a slot on a bracket on the upper end of a support post, to permit the tray to be moved between a horizontal working position and a vertical storage position. The pivot axis and associated slot are positioned such that the tray is released from the working position by sliding the pivot axis from one end of the slot to the other. The post is slidably journaled through a sleeve on a mounting plate, to permit vertical adjustment of the height of the tray.

BRIEF DESCRIPTION OF THE SEVERAL VIEWS OF THE DRAWING

The preferred embodiment of the invention is illustrated in the accompanying drawings, in which similar or corresponding parts are identified with the same reference numeral throughout the several views, and in which.

DETAILED DESCRIPTION OF THE INVENTION

Figure 1:
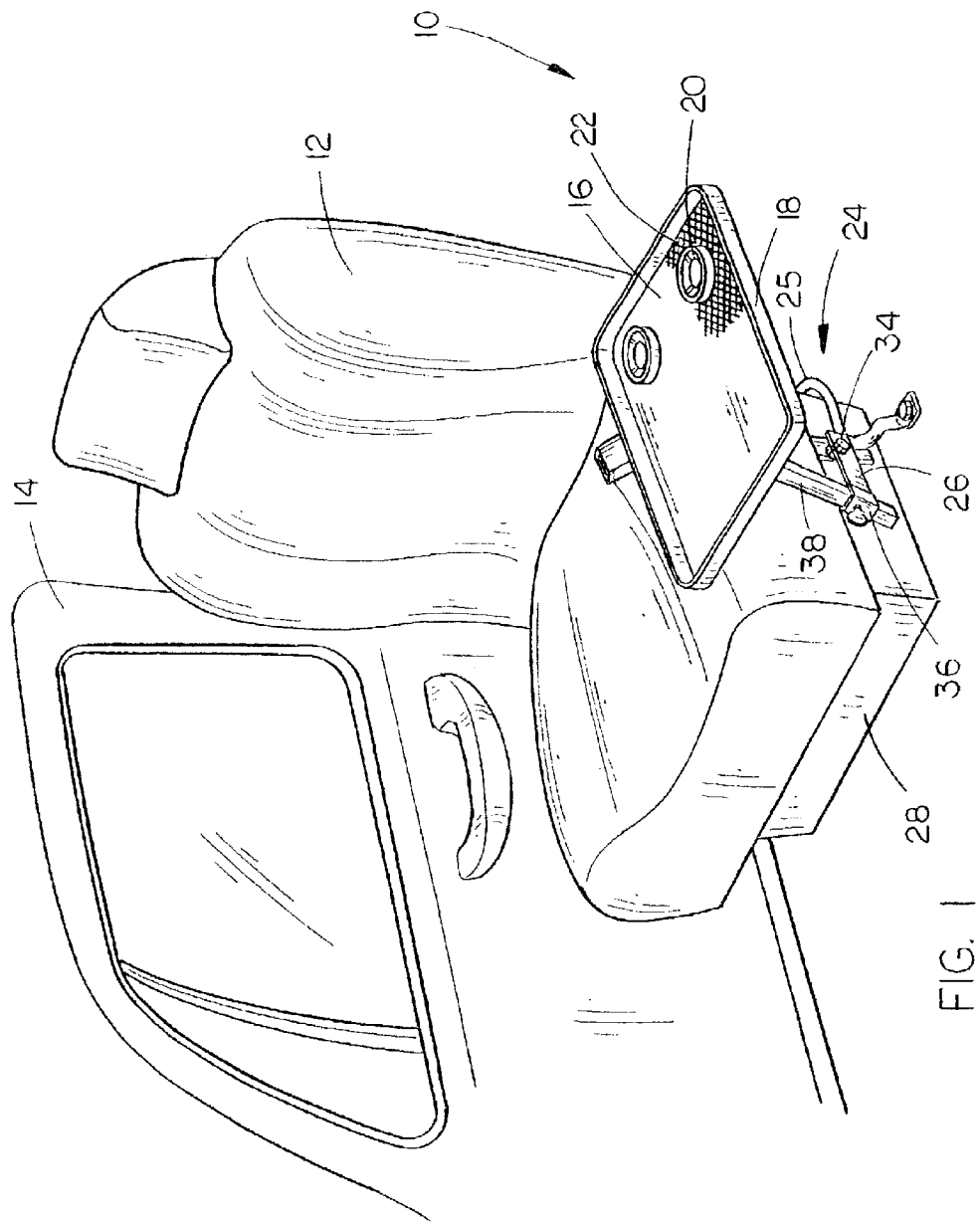
FIG. 1 is a perspective view of the travel tray of the present invention, installed in a vehicle cab.

Referring now to the drawings, in which similar or corresponding parts are identified with the same reference numeral, and more particularly to FIG. 1, the travel tray of the present invention is designated generally at 10, and is shown mounted to a passenger seat 12 in a vehicle 14. The travel tray of the present invention includes a generally rectangular planar tray 16 with a short projecting lip 18 projecting upwardly around the perimeter of the tray 16. A pair of can and bottle retainer rings 20 are formed in the tray to accept and hold a can or bottle of a conventional beverage. A non-skid mat 22 is provided on the upper surface of tray 16 to retain materials in position on the top of tray 16.

The support frame 24 for folding tray 10 includes a bracket 26 that may be mounted directly to the base 28 of seat 12, as shown in FIG. 1. The inventor has also found that the bracket may be conveniently mounted on the existing seatbelt bar on the passenger seat of a vehicle. The mounting of the device 10 to the passenger seat provides convenient access to both the driver and the passenger, but will fold out of the way quickly and easily, as described in more detail hereinbelow.

In the preferred embodiment of the invention, bracket 26 is attached to the existing seat belt bar 25, by first removing the bolt 34 for the seatbelts on the inside of the passenger seat. Bolt 34 is replaced after positioning bracket 26 thereon, along with the existing web belt floor anchor and seat belt buckle latch arm.

Figure 3:
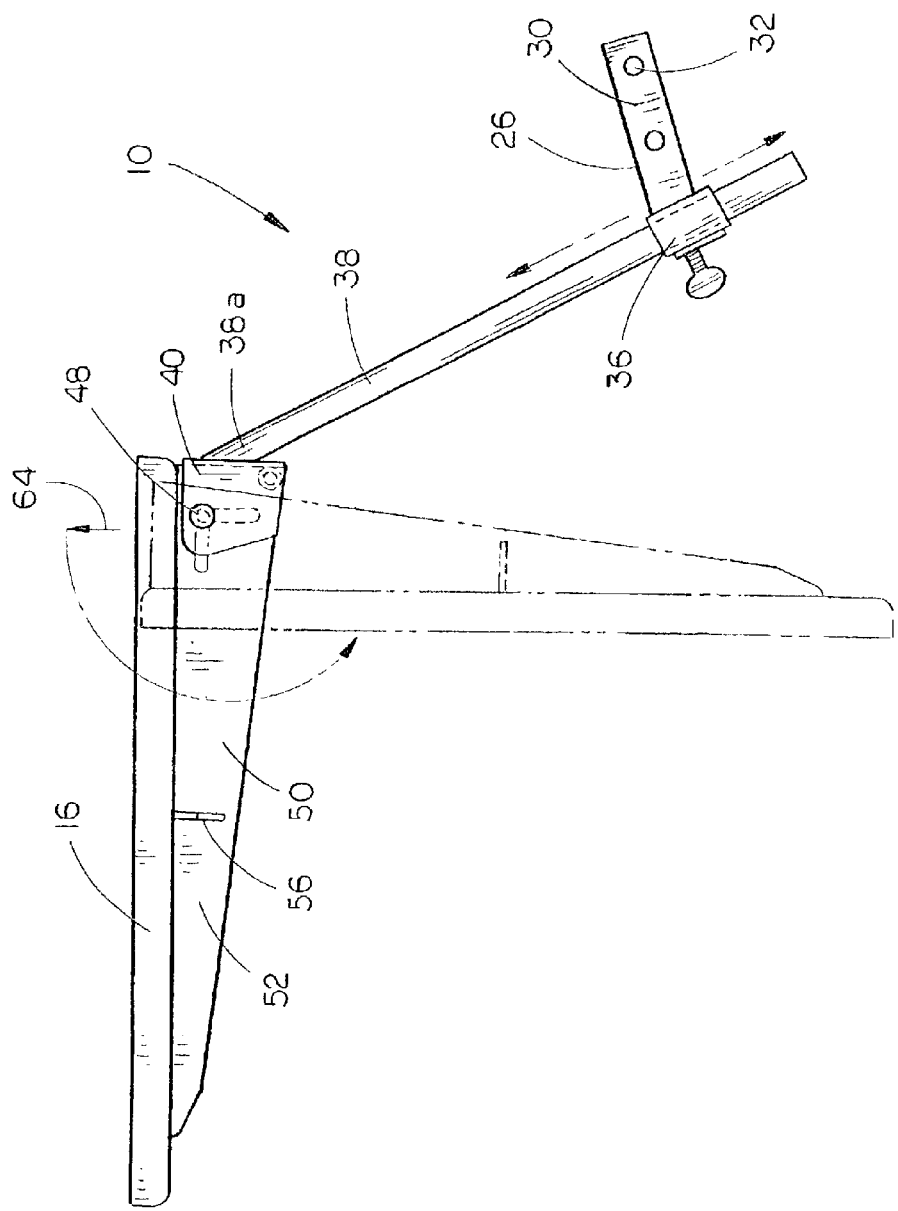
FIG. 3 is a side elevation view of the invention, showing the movement of the tray from working to storage positions and the height adjustment of the tray.

Referring now to FIG. 3, bracket 26 includes a plate 30 with an aperture 32 for receiving the seat belt holding bolt 34 (shown in FIG. 1), to secure the bracket 26 in position. A tubular sleeve 36 is mounted on one end of plate 30, so as to project outwardly from the vehicle seat 12 (also shown in FIG. 1). Sleeve 36 is oriented generally vertically, to adjustably secure the tray height adjustment post 38 in a vertical position adjacent to the seat 12. A setscrew 40 is threaded through a threaded aperture in the sidewall of sleeve 36, to selectively secure the post 38 in a desired position.

Preferably, sleeve 36 is square or polygonal in cross-sectional shape, and post 38 is of the same polygonal shape, so that the post 38 is prevented from rotating about its longitudinal axis, yet is permitted to easily slide up and down within the sleeve 36. To this end, post 38 is an elongated member formed of solid or tubular rigid material, with the lower end slidably journaled through sleeve 36.

Figure 2:
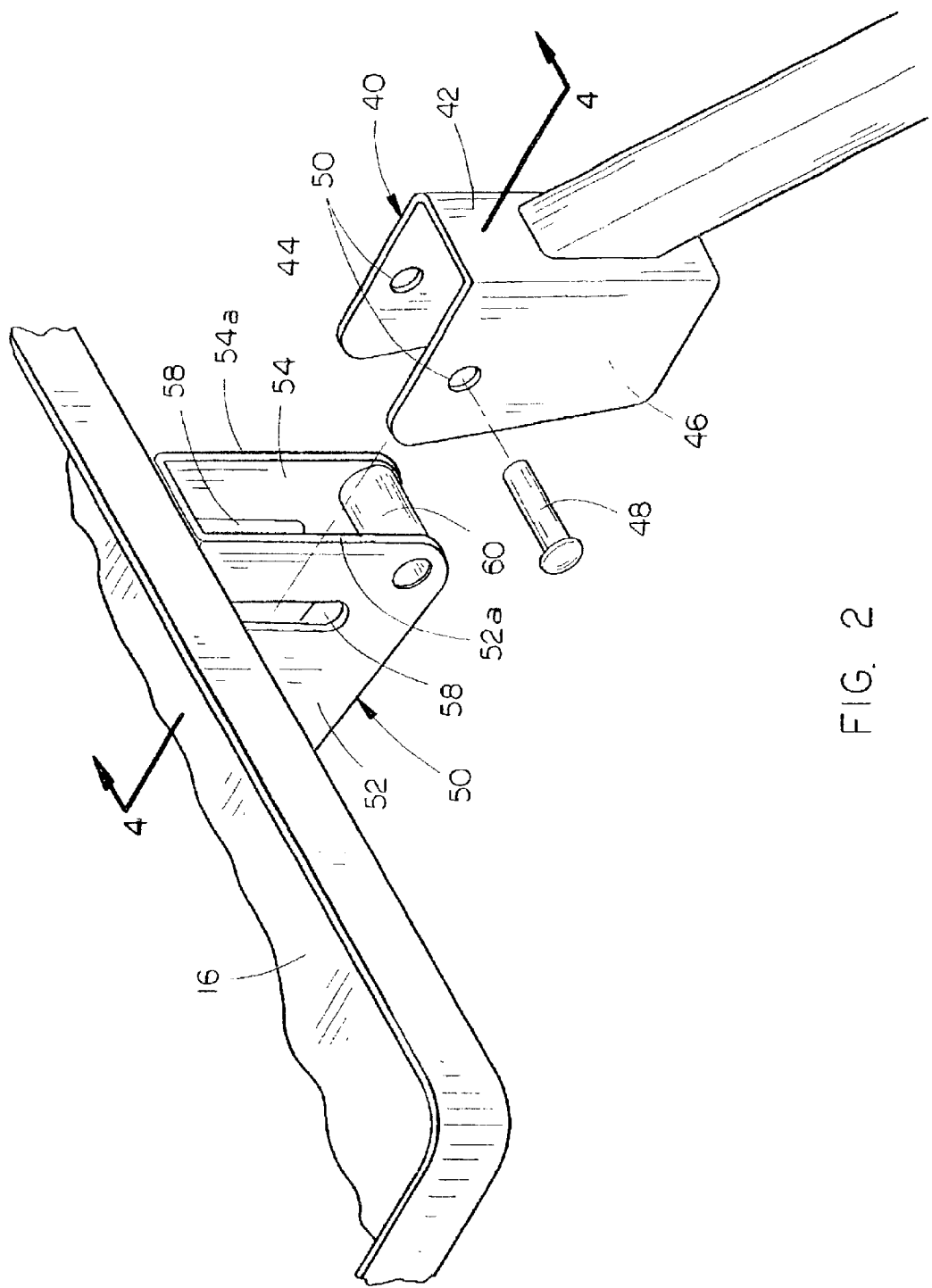
FIG. 2 is an enlarged exploded perspective view of the attachment of the tray to the height adjustment post.

Referring now to FIG. 2, a U-shaped bracket 40 is affixed to the upper end 38a of post 38, with its base 42 oriented vertically, and its legs 44 and 46 projecting horizontally from the vertical edges of the base 42. A pivot pin 48 is journaled through a pair of aligned apertures 50 formed in the upper end of each leg 44 and 46, and serves as the pivot axis for the tray 16, as described below.

Tray 16 has an elongated U-shaped channel 50 affixed to its bottom surface, with the legs 52 and 54 of the channel 50 extending downwardly when the tray is in a horizontal position, as shown in FIGS. 2 and 3. A transverse gusset 56 on each side of the channel 50 maintains the channel 50 in an upright position with the legs projecting at a right angle to the bottom of the tray 16. A pair of vertically oriented slots 58 are formed in each channel leg 52 and 54 adjacent the rearward edges 52a and 54a, respectively of the legs 52 and 54. Pivot pin 48 is journaled through slots 58, to operably interconnect the tray 16 to the post 38.

A roller pin or bearing 60 is mounted at, and extends between, the junction of the rearward edges 52a and 54a with the lower edges of the channel 50.

Figure 4A:
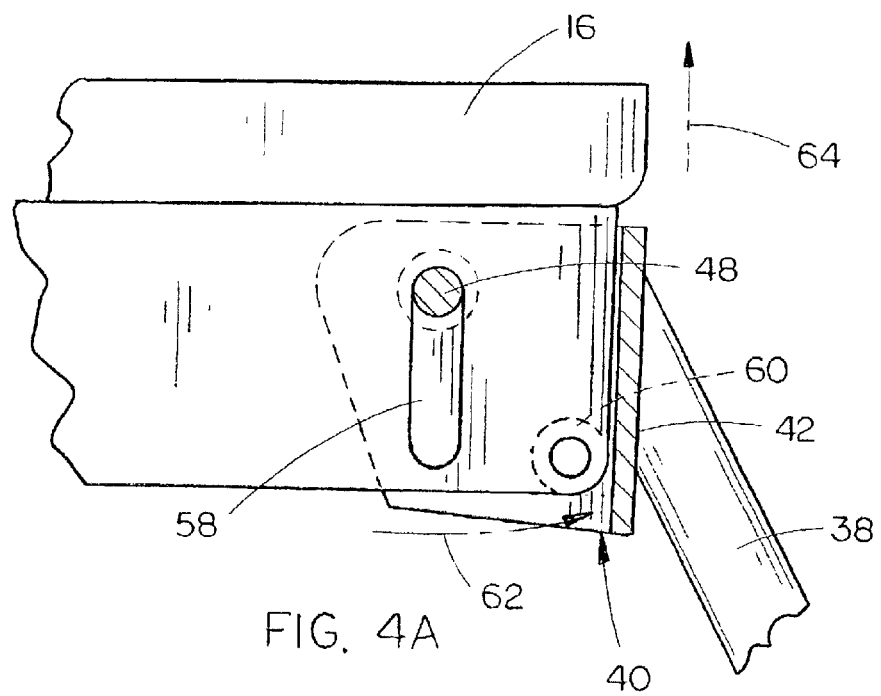
FIG. 4A is an enlarged sectional view taken at lines 4—4 in FIG. 2, with the tray in the working position.

Referring now to FIG. 4A, tray 16 is shown in the horizontal "working" position, wherein snacks and beverages may be supported on the top of the tray surface. The tray 16 is supported in this horizontal orientation by virtue of the abutting contact of bearing 60 against the base 42 of bracket 40 on post 38. This abutting contact is caused by the pivoting of the tray 16 on pivot pin 48, which is located in the upper end of slots 58, such that pivotal movement is along the arc shown by arrow 62.

Figure 4B:
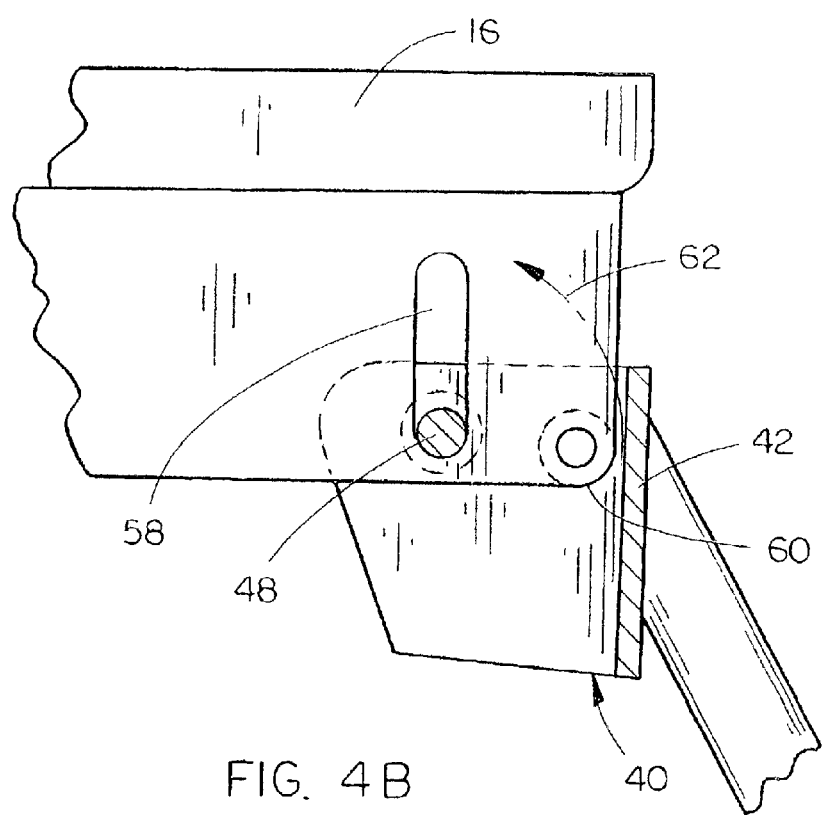
FIG. 4B is a view similar to FIG. 4A, but with the tray moved to a disengaged position for pivoting to the storage position.

Tray 16 may be quickly and easily shifted to the storage position shown in broken lines in FIG. 3, by first raising the tray vertically shown by arrows 64 in FIGS. 3 and 4A, so as to shift the pivot pin 48 to the lower end of slots 58, as shown in FIG. 4B. Because the pivot axis of the tray is shifted the arc 62 through which the bearing 60 pivots is redirected, as shown in FIG. 4B, so that bearing 60 will pivot past the bracket base 42, allowing the tray to swing down to the storage position shown in FIG. 3. The tray 16 is returned to the "working" position by reversing these steps.

Whereas the invention has been shown and described in connection with the preferred embodiment thereof, many modifications, substitutions and additions may be made which are within the intended broad scope of the appended claims.

What is claimed is:

1. A fold-down travel tray, comprising:

a rigid, planar tray having top and bottom surfaces and forward and rearward edges;

a generally vertically-oriented post for supporting the tray above the ground;

said tray having an operable connection for operably connecting the tray to an upper end of the post for selectively pivotal movement between a horizontal working position and a generally vertical storage position;

said operable connection including:

a tray support member mounted on the bottom of the tray and extending forwardly from the rearward edge thereof;

said tray support member having at least one vertically-oriented slot formed therein proximal a rearward edge of the support member;

a pivot pin slidably journaled within said slot and pivotally connected to a bracket on the upper end of the post to form a tray pivot axis, whereby the tray pivot axis is slidable alone the slot;

said slot positioned such that the rearward edge of the support member engages the post bracket and is prevented from pivoting about the pin when the pin is located in a first, upper end of the slot, and such that the rearward edge of the support member swings free of the post bracket when the pin is located in a second, lower end of the slot, the orientation of the slot thereby preventing horizontal and pivotal movement of the tray when the tray is in the horizontal working position, but permitting vertical movement of the tray to locate the pivot pin in the lower end of the slot to thereby permit pivotal movement of the tray to the storage position;

a mounting plate adjustably connected to the post for mounting the post to an object, said plate connected to the post for selective movement along the vertical extent of the post;

said tray support member including an inverted channel with legs projecting downwardly from the bottom of the tray;

said at least one slot including a slot formed in each leg, aligned with one another;

said pin extending between said slots and slidable therein;

said bracket including a U-shaped member having a pair of legs proecting from a said pivot pin connected between the legs of the bracket;

said mounting plate including a sleeve mounted on one end thereof with a longitudinal axis oriented generally vertically, said post being slidably journaled through the sleeve, and further comprising means on the sleeve for selectively restraining the post from slidable movement.

2. The travel tray of claim 1, wherein said sleeve has a polygonal cross-sectional shape, and wherein said post has a similar cross-sectional shape, to thereby prevent rotational movement of the post within the sleeve, while permitting selective slidable movement.

3. A fold-down travel tray, comprising:

a rigid, planar tray having top and bottom surfaces and forward and rearward edges;

a generally vertically-oriented post for supporting the tray above the ground;

said tray having an operable connection for operably connecting the tray to an upper end of the post for selectively pivotal movement between a horizontal working position and a generally vertical storage position;

said operable connection including:

a tray support member mounted on the bottom of the tray and extending forwardly from the rearward edge thereof;

said tray support member having at least one vertically-oriented slot formed therein proximal a rearward edge of the support member;

a pivot pin slidably journaled within said slot and pivotally connected to a bracket on the upper end of the post to form a tray pivot axis, whereby the tray pivot axis is slidable along the slot;

said slot positioned such that the rearward edge of the support member engages the post bracket and is prevented from pivoting about the pin when the pin is located in a first, upper end of the slot, and such that the rearward edge of the support member swings free of the post bracket when the pin is located in a second, lower end of the slot, the orientation of the slot thereby preventing horizontal and pivotal movement of the tray when the tray is in the horizontal working position, but permitting vertical movement of the tray to locate the pivot pin in the lower end of the slot to thereby permit pivotal movement of the tray to the storage position;

a mounting plate adjustably connected to the post for mounting the post to an object, said plate connected to the post for selective movement along the vertical extent of the post;

said mounting plate including a sleeve mounted on one end thereof with a longitudinal axis oriented generally vertically, said post being slidably journaled through the sleeve, and further comprising means on the sleeve for selectively restraining the post from slidable movement.

4. The travel tray of claim 3, wherein said sleeve has a polygonal cross-sectional shape, and wherein said post has a similar cross-sectional shape, to thereby prevent rotational movement of the post within the sleeve, while permitting selective slidable movement.

* * * * *